Aug. 1, 1950        O. JENSEN        2,517,435

DISCONNECT SWITCH

Filed July 31, 1946        7 Sheets-Sheet 2

Fig. 1

INVENTOR.
Otto Jensen
BY Ostrolenk & Faber
Attorneys

Aug. 1, 1950     O. JENSEN     2,517,435
DISCONNECT SWITCH Filed July 31, 1946     7 Sheets-Sheet 3

Fig. 2

INVENTOR.
Otto Jensen
BY Ostrolenk & Faber
Attorneys

Fig. 3

Aug. 1, 1950          O. JENSEN          2,517,435
DISCONNECT SWITCH Filed July 31, 1946          7 Sheets-Sheet 5

Fig. 4

INVENTOR.
Otto Jensen
BY Ostrolenk & Faber
Attorneys

Fig. 6

Patented Aug. 1, 1950

2,517,435

UNITED STATES PATENT OFFICE 2,517,435

DISCONNECT SWITCH

Otto Jensen, Malvern, Pa., assignor to I. T. E. Circuit Breaker Company, Philadelphia, Pa., a corporation of Pennsylvania Application July 31, 1946, Serial No. 687,429

7 Claims. (Cl. 200—48)

My present invention relates to disconnect switches, and more particularly to switches adapted to enclosed bus runs wherein the construction of the switch requires no enlargement or special construction of the housing or enclosure for the bus run at the point where the switch is located.

My invention contemplates specifically a disconnect switch having tubular disconnect contacts wherein the movable contact telescopes into the bus or an extension thereof and wherein the stationary or complementary contact extends also axially of the bus and has a tubular recess to receive the movable contact.

Essentially my disconnect switch comprises therefore telescoping sections of tubing with appropriate camming features to expand the inner tube in order to provide adequate contact pressure.

The chief advantages of my disconnect switch are its simplicity and compactness. Most disconnect switches, in order to get sufficient breaking distance, require considerably more space than my device.

My device lends itself to metal enclosures which is a desirable safety feature.

A primary object of my invention, therefore, is the provision of a disconnect switch comprising telescoping tubular elements.

Another object of my invention is the provision and arrangement of disconnect switches so that they may readily be housed in bus enclosures without requiring any special enlargement or conformation of the bus enclosure at the point where the switches are housed.

The foregoing and many other objects of my invention will become apparent in the following description and drawings in which.

Figure 1:
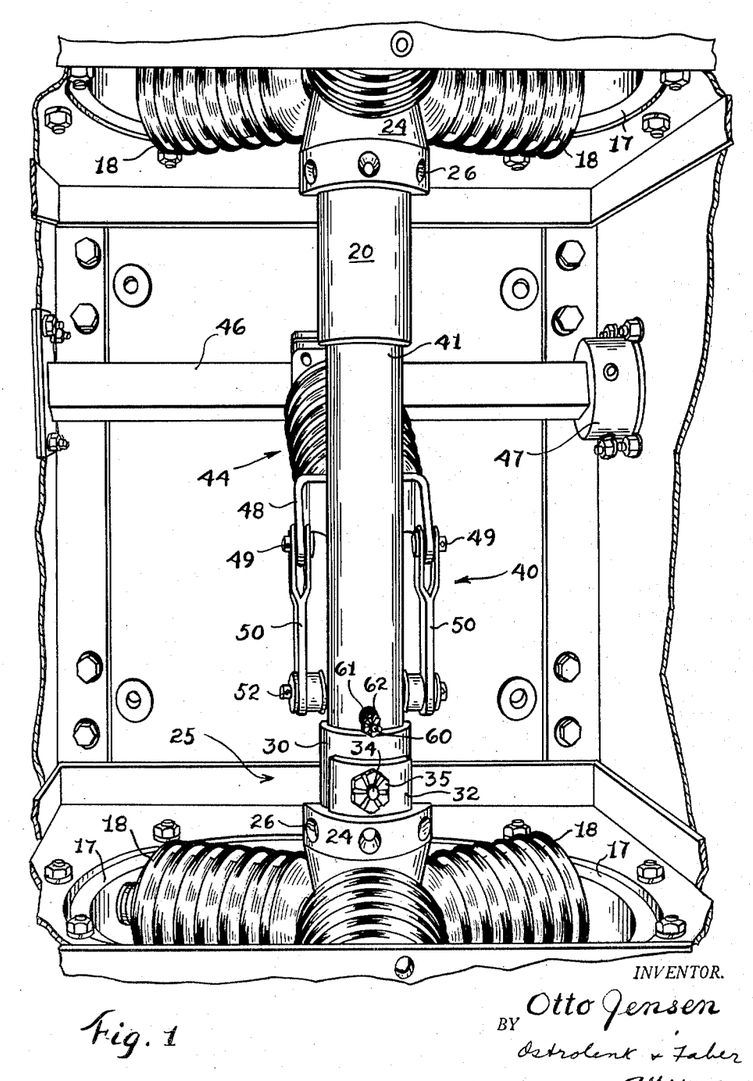
Figure 1 is a view in perspective of my novel disconnect switch in a closed position.
Figure 1A:
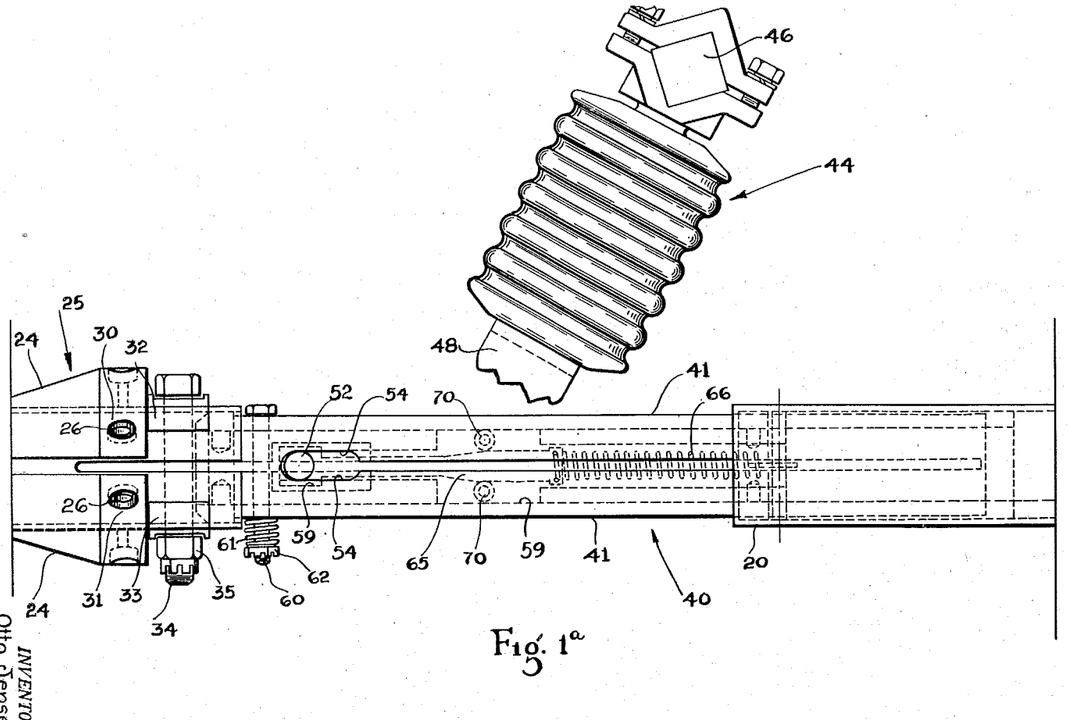
Figure 1a is an orthographic side view of my novel invention in the closed position.
Figure 2:
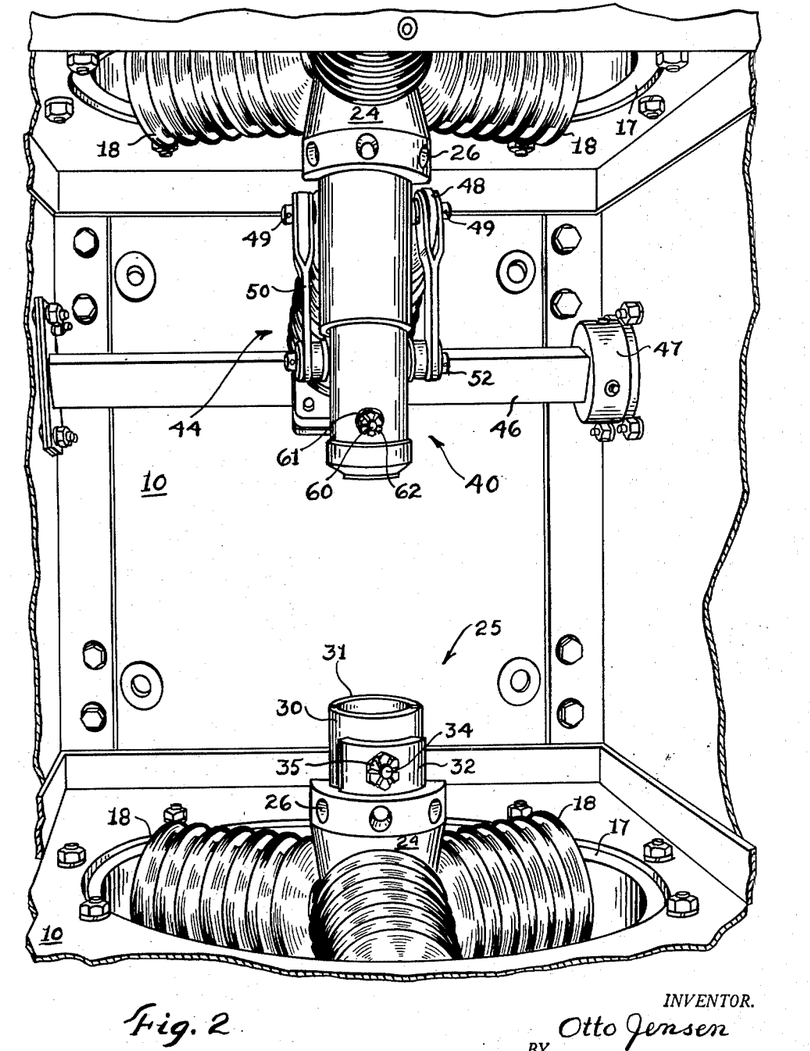
Figure 2 is a view in perspective of my novel disconnect switch in the open position.

Referring now to Figures 1 and 2, I have here shown one phase of my novel disconnect switch as contained in an enclosure 10 which is shown as rectangular although it may be of any suitable cross-section.

Figure 4:
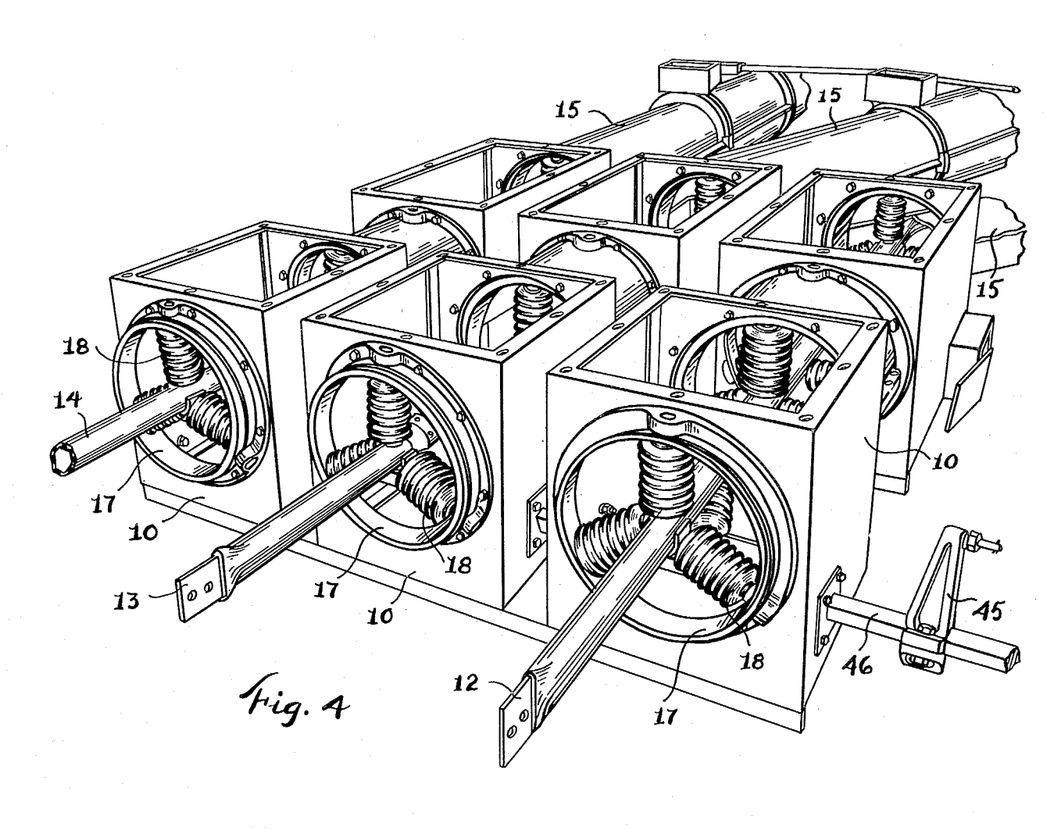
Figure 4 is an enlarged view in perspective showing a 3-phase bus system embodying my novel disconnect switches.

As shown in Figure 4, the bus runs 12, 13, 14 are housed in substantially circular enclosures 15, 15 which enclosures may have the form and construction shown in Patent No. 2,396,131. The buses which in this case are shown as circular are supported from rings 17 by insulators 18 in the manner shown in the above mentioned patent.

The enclosure 10 for the disconnect switch is here shown as rectangular, while the housings 15 for the bus runs 12, 13, 14, are shown as circular. It will be obvious from the further description of my novel disconnect switch hereinafter contained that the construction thereof is consistent with a continuous circular housing 15.

The utilization of the substantially rectangular enclosure 10 permits a simplified arrangement wherein covers may readily be removed from the enclosures 10 to provide for inspection, replacement and repair of the contacts.

As seen in Figures 1 and 2, one phase of the bus run has been separated so that the ends 20 and 21 enter opposite ends of the chamber 10. These ends are either a continuation of the tubular bus or tubular recesses provided for the purpose of my invention when used in connection with other shapes of bus run.

The ends of the bus 20 and 21 are supported by rings 17 and insulators 18 more fully described in my Patent No. 2,396,131. The bus ends are anchored in place by the anchor bus collars 24—24 which are securely fastened to the bus by set screws 26.

The end 21 of the stationary bus is bifurcated to form the half-cylindrical sections 30 and 31 which act as a stationary contact 25 to receive the movable contact sleeve assembly 40. The clamping plates 32 and 33 are held in appropriate spaced relation by the bolt 34 which passes through the two clamping plates 32, 33 and the half-cylinders 30, 31 and are fastened by the nut 35.

The nut 35 is tightened so that the clamping plates 32 and 33 are held in appropriate spaced relation to each other. Ordinarily half-cylinders 30 and 31 are slightly loose or spaced from the clamping plates 32 and 33. When, however, the movable contact member 40, hereinafter described, is inserted in the stationary tubular contact structure between the half-cylinders 30 and 31, it wedges these half-cylinders apart to a limited degree, that is, until these half-cylinders bear tightly against the inside surfaces of the opposite clamping plates 32 and 33, which limit further spreading or expansion of the stationary tubular contact 25.

The tubular recess of the opposite bus 20 carries a movable contact sleeve assembly 40 which is slidably mounted therein, the tubular recess 20 being sufficiently deep so that the movable contact sleeve assembly 40 may readily move between the closed position of Figure 1 and the open position of Figure 2.

The movable contact sleeve assembly 40 is sufficiently long so that in the closed position of Figure 1 the movable contact 40 has an appropriate bearing in the tubular recess of the bus 20 to hold it in rigid position. The movable contact sleeve assembly 40 is operated between the closed and open position by the crank arm 45 (Figure 4) mounted on the movable contact operating shaft 46 (Figures 1, 2, 3, 4) which passes through the enclosure 10, being carried in appropriate bearings 47 on the sides of the enclosure which permit it to rotate.

As seen in Figure 4, a single shaft 46 may operate three phases. Referring again to Figures 1 and 2, contact operating shaft 46 within each enclosure carries an operating crank arm assembly 44 of insulating material terminating in a U-shaped member 48 which is pivotally connected at 49, 49 to links 50, 50 on opposite sides of the movable contact. Links 50, 50 are pivotally connected to the cross-pin 52 passing through the slotted opening 54 in the movable contact sleeve assembly 40 (see also Figure 3).

The movable contact sleeve assembly 40 as seen in Figures 1, 1a, 2, 3, 5, 5a comprises an outer bifurcated cylindrical sleeve 41 and two interior spreading members 57 and 58.

Figure 5:
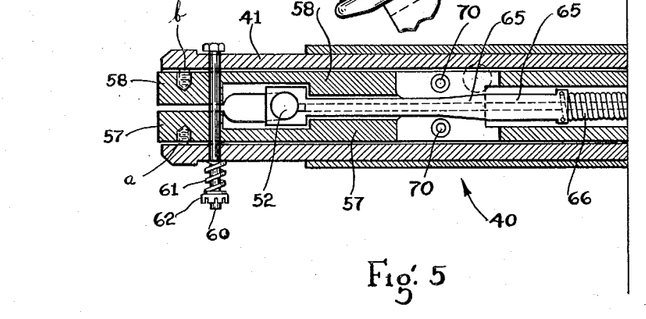
Figure 5 is a cross-sectional view taken on line 5—5 of Figure 3 showing the arrangement for causing a movable contact to clamp tight in the complementary contact.
Figure 5A:
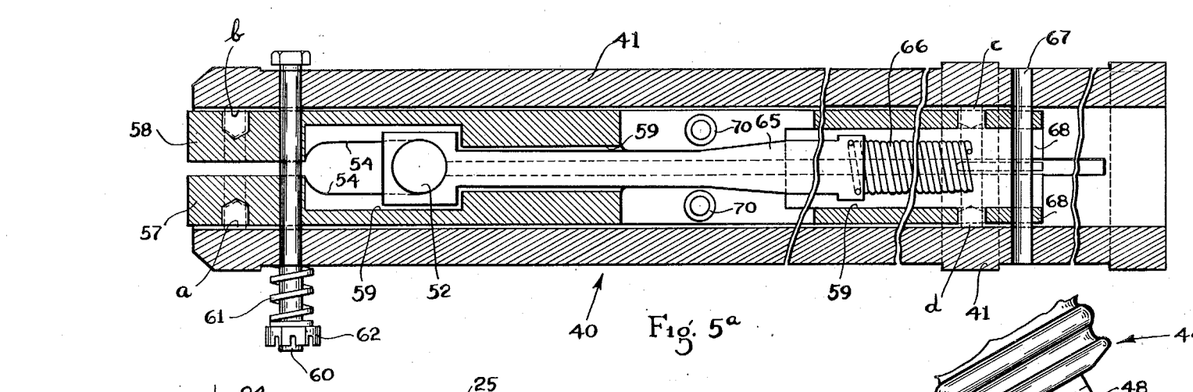
Figure 5a is an enlarged cross-sectional view of the movable contact.
Figure 6:
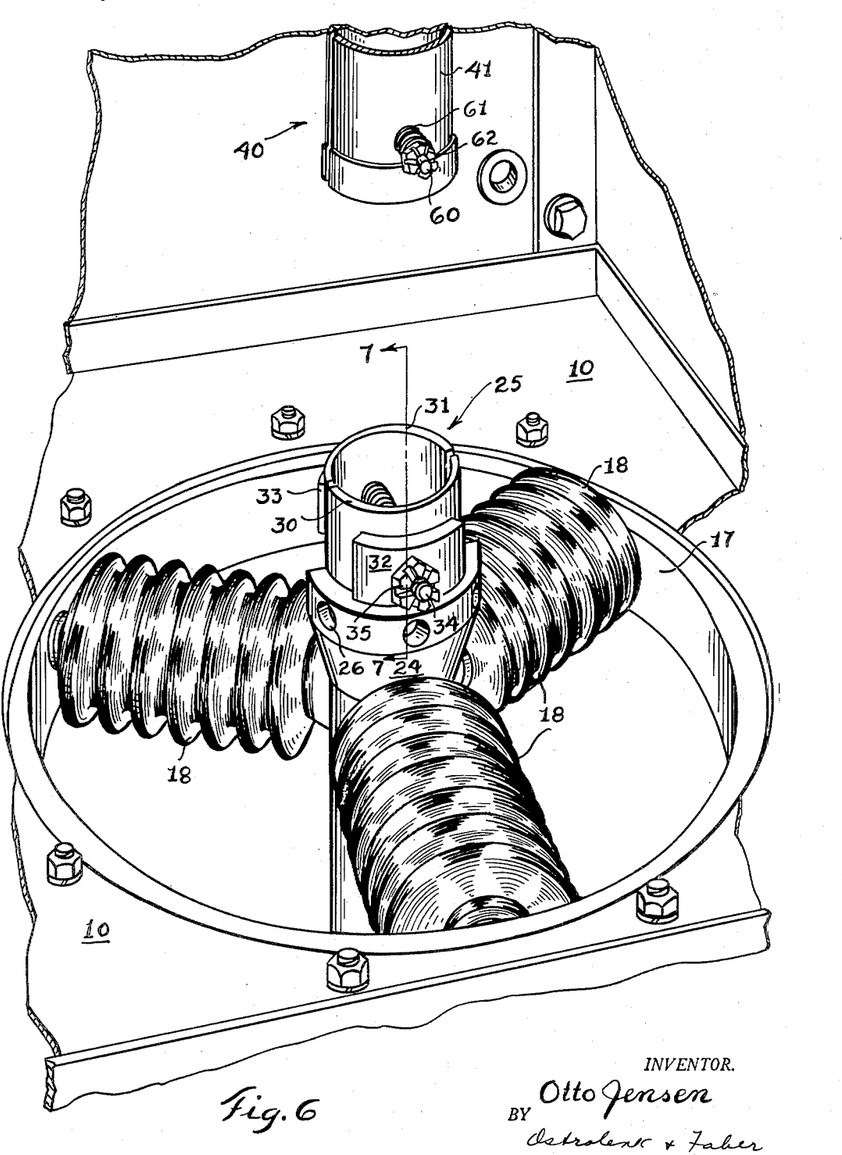
Figure 6 is a fragmentary enlarged view of the stationary or complementary contact.
Figure 7:
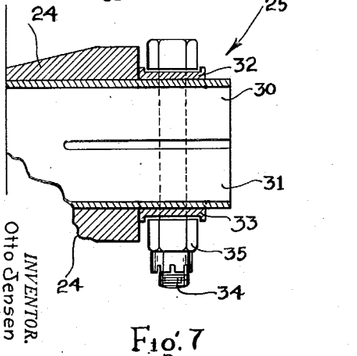
Figure 7 is a cross-sectional view taken on line 7—7 of Figure 6.

Within a slotted recess 59—59, in the spreading members 57—58, rides the clamping cam 65 which is biased against movement by spring 66.

In the open position of Figures 2 and 5, cross-pin 52 is moved back in the slotted recess 54. Opposed by the spring 66 the clamping cam 65 is drawn out of engagement with the rollers 70—70 thus relieving the expanding action on the spreading members 57—58. This allows the movable contact 40 to be withdrawn from the stationary contact member 25 upon rotation of the shaft 46.

In order to close the switch, the shaft 46 is rotated clockwise. This action urges the clamping cam 65 into engagement with the rollers 70 but the bias of spring 66 being stronger than the sliding friction of the movable contact sleeve assembly 50 permits the entire assembly 40 to move to the closed position of Figures 1, 1a, 2, 3, 5, 5a.

When the ends of the spreading members 57—58 butt against the bolt 34, further forward movement of the movable contact sleeve assembly 40 is impossible and continued rotation of the shaft 46 moves the cam piece 65 against the bias of spring 66 into engagement with the cam rollers 70—70. This action takes place through the crank arm 45, the V-shaped member 48, the links 50—50, and the cross-pin 52.

When the clamping cam 65 is forced between the cam rollers 70, 70, it tends to force the spreading members 57—58 apart. Because the spreading members 57—58 are comparatively rigid they tend to separate and by bearing on the interior surface of movable contact sleeve 41 at the semi-annular rings (a, b, c, d) force the bifurcated movable contact sleeve 41 to expand within the stationary contact tube thus giving proper contact pressure.

A compression spring 61 is captured between the outer surface of the movable contact sleeve 41 and the nut 62 of the bolt 60. The compression spring 61 drives the half-cylindrical sections of the bifurcated movable contact sleeve 41 toward each other and thus tends to contract the outer diameter of the movable contact sleeve allowing it to enter the stationary contact assembly 25.

Figure 3:
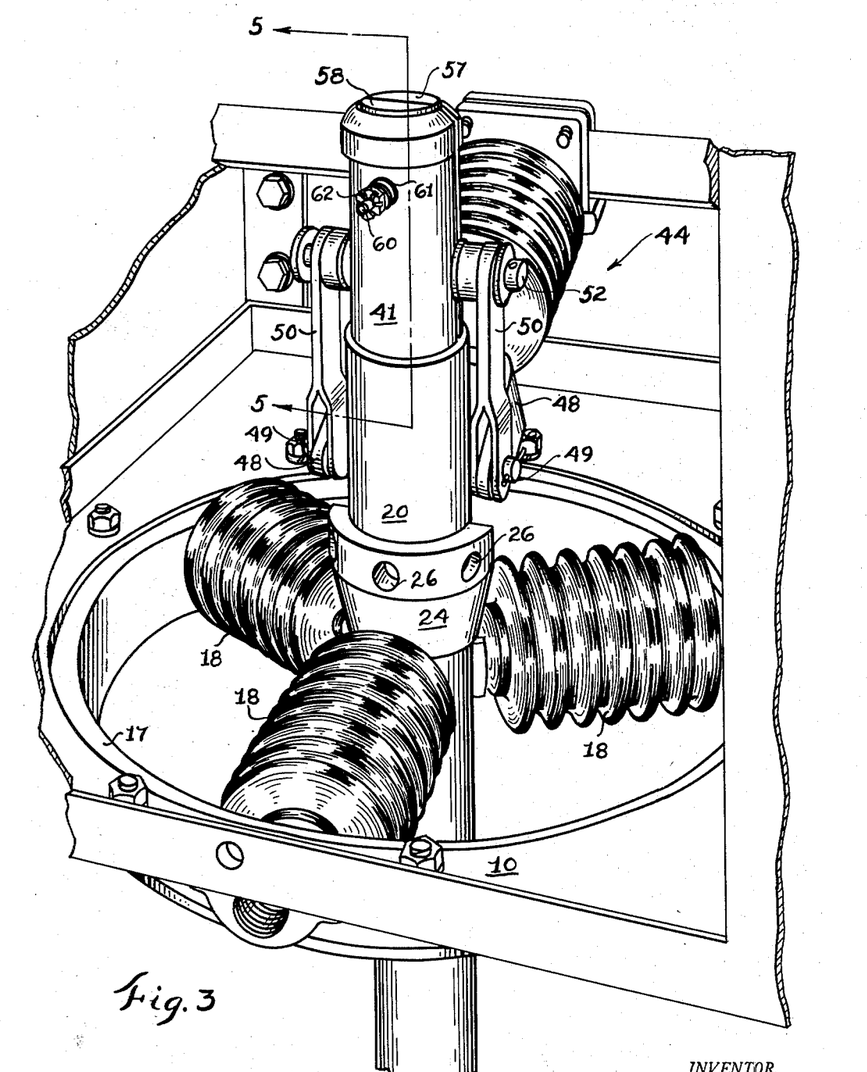
Figure 3 is an enlarged view in perspective of the moving contact.

As previously pointed out, the movable contact member is slotted at 54, the slot as shown in Figures 3 and 5 registering on each side with the space between the half-cylindrical members 57, 58 and thus comprises recesses in their edges.

It will now be seen that in the open position of Figure 2, the cross-pin 52 is at the upper portion of the slot adjacent the sleeve 40. When the crank 45 is turned to rotate the contact operating shaft 46 to move the contact to closed position, insulated crank arm 44 is turned thereby pushing down on links 50. This pushes down on the cross-bar 52 which pushes toward the ends of the slots 54 adjacent the contact ends of the moving contact sleeve assembly 40.

However, the spreading or wedging action is not here exerted since the moving contact sleeve assembly 40 is free to slide in the bus end tubular recess 20. The moving contact sleeve assembly 40 is thus moved down by the continued rotation of the shaft 46 until the contact end of the moving contact assembly 40 enters the stationary contact assembly 25.

When the bolt 60 protruding from opposite sides of the moving contact assembly 40 strikes the upper annular edge of the stationary contact 25, the contact end of the moving contact 40 has fully entered into the stationary contact. Now continued rotation of the shaft 46 will drive the cross-bar or pin 52 down the slot 54 spreading the two half-cylindrical members 57, 58 apart.

As previously pointed out, the half-cylinders 30 and 31 of the stationary contact 25 will give slightly to the spreading movement to ensure that the moving contact enters therebetween. A further spreading movement, by pushing the cross-bar home to the end of the slot 54 will spread the two half-cylindrical members 57, 58 of the movable contact apart to bear tightly against the inner contacting surfaces of the stationary contact.

During the opening operation, the first rotation of the shaft 46 pulls the cross-bar 52 up in the slot 54 to loosen the engagement between the movable and stationary contact, and further rotation of the shaft 46 pulls the movable contact assembly sleeve 40 out of the stationary contact 25.

It will be seen from a comparison of Figures 1 and 2 that the breaking distance may be made as much or as small as is necessary to effectively disconnect the two buses which are controlled by the disconnect switch.

The housing or enclosure need not be made especially for the disconnect switch. Where, for instance, a bus run housing of circular cross-section is used, the only modification required for the portion of the housing holding the disconnect switch is that openings be provided therein to provide bearings for the contact operating arm 46. Where a rectangular enclosure 10, such as that shown in the figures, is used, a removable door or panel may readily be provided to simplify inspection and replacement of parts. Where no such special enclosure or removable panel is provided, an inspection and replacement of parts of the disconnect switch is no more difficult than the same operation in connection with other portions of the bus run.

In the foregoing I have described my invention solely in connection with an illustrative embodiment thereof. Since many variations and modifications of my invention should now be obvious to those skilled in the art, I prefer to be bound not by the specific disclosures herein but only by the appended claims.

I claim:

1. In a bus run, an interrupted bus bar, one end of said bus bar having a tubular recess, a disconnect switch comprising a movable contact and a fixed contact, the end of said fixed contact extending axially from one end of said bus bar, and being bifurcated to form half-cylindrical sections, and said movable contact being carried in the tubular recess of said one end of said bus bar, means for operating said movable contact into the bifurcated cylindrical section of said fixed contact, clamping means operative after said movable contact has moved into said bifurcated cylindrical section of said fixed contact for effecting clamping engagement with said fixed contact a metallic housing for said bus bar and disconnect switch, the cylindrical end of said fixed contact receiving said movable contact, and insulators for supporting said bus bars and switch members centrally within said housing.

2. In a bus run, an interrupted bus bar, one end of said bus bar having a tubular recess, a disconnect switch comprising a movable contact and a fixed contact, the end of said fixed contact extending axially from one end of said bus bar, and said movable contact being carried in the tubular recess of said one end of said bus bar, said movable contact comprising an outer bifurcated cylindrical sleeve and interior spreading members, means for operating said movable contact to engage said fixed contact and a housing for said bus bar and disconnect switch, said fixed contact having a recess to receive said movable contact, and means including a clamping cam centrally disposed within said movable contact which on movement of said movable member spreads said spreading member to in turn spread said movable contact after it has been received in said recess for effecting good contact engagement between said fixed and movable contacts, and insulators for supporting said bus bars and switch members centrally within said housing.

3. In a bus run, an interrupted bus bar, one end of said bus bar having a tubular recess, a disconnect switch comprising a movable contact and a fixed contact, the end of said fixed contact extending axially from one end of said bus bar, and being bifurcated to form half-cylindrical sections, and said movable contact being carried in the tubular recess of said one end of said bus bar, means for operating said movable contact to engage said fixed contact and a housing for said bus bar and disconnect switch, the cylindrical end of said fixed contact receiving said movable contact, and means comprising a centrally disposed cam mechanism for spreading said member to in turn expand said movable contact after it has been received in said recess for effecting good contact engagement.

4. In combination, a discontinuous bus bar, a disconnect switch having a contact member engaged to one end of said bus bar and a contact member engaged to the adjacent end of said bus bar and means for effecting axial movement of one of said contacts with respect to the other for effecting engagement of said contacts, one of said contacts being bifurcated, clamping plate and means adjacent said bifurcated contact for clamping said contact into engagement with the other of said contacts, one of said contacts being cylindrical in shape and the other of said contacts being a hollow cylinder in shape and being slit to form half cylinders, the hollow of said other contact receiving said first contact and a centrally disposed cam means for clamping said slit sections against said one of said contacts after said contacts are engaged.

5. In combination, a discontinuous bus bar, a disconnect switch having a contact member engaged to one end of said bus bar and a contact member engaged to the adjacent end of said bus bar and means for effecting axial movement of one of said contacts with respect to the other for effecting engagement of said contacts, one of said contacts being bifurcated, clamping plate and means adjacent said bifurcated contact for clamping said contact into engagement with the other of said contacts, one of said contacts being cylindrical in shape and the other of said contacts being a hollow cylinder in shape and being slit to form half cylinders, the hollow of said other contact receiving said first contact and a centrally disposed wedging means automatically responsive to the insertion of said one of said contacts into the hollow of said other contact for clamping said contacts to each other after said contacts are engaged.

6. In combination, a discontinuous bus bar, one end of said bus bar being bifurcated to form a pair of half-cylindrical sections which act as a stationary contact, clamping plates secured to said stationary contacts, said plates being normally slightly spaced from said cylindrical sections, the other end of said bus opposite the one end of said continuous bus bar having a tubular recess, a contact sleeve slidably mounted in said recess and forming a movable contact, the recess being sufficiently deep so that the movable sleeve moves from open to contact engagement with said stationary contact while maintaining appropriate bearing in said tubular recess of said bus bar to hold said movable sleeve in rigid position, said contact sleeve comprising an outer bifurcated cylindrical sleeve and a pair of interior spreading members, a clamping cam within said spreading members, means for biasing said cam toward said other end of said bus bar, means for axially moving said movable contact, the bias of said cam preventing movement of said cam until said movable contact has entered the pair of half-cylindrical sections, further operation of said last mentioned means thereafter operating said spreading members to engage and spread said clamping plates into engagement with said cylindrical sections for effecting a clamping engagement between said fixed and movable contacts, a metallic housing for said bus bar and contacts and insulators for mounting said bus bar and contacts centrally within said housing.

7. In combination, a discontinuous bus bar, one end of said bus bar being bifurcated to form a hollow section which acts as a stationary contact, clamping plates secured to said stationary contacts, the other end of said bus opposite the one end of said continuous bus bar having a recess, a contact sleeve slidably mounted in said recess and forming a movable contact, the recess being sufficiently deep so that the movable sleeve moves from open to contact engagement with said stationary contact while maintaining appropriate bearing in said recess of said bus bar to hold said movable sleeve in rigid position, said contact sleeve comprising an outer sleeve and a pair of interior spreading members, a centrally disposed clamping cam within said spreading members, means for biasing said cam toward said other end of said bus bar, means for axially moving said movable contact, the bias of said cam preventing movement of said cam until said movable contact has entered said section, further operation of said last mentioned means thereafter operating said spreading members to engage and spread said clamping plates into engagement with said cylindrical sections for effecting a clamping engagement between said fixed and movable contacts, a metallic housing for said bus bar and contacts and insulators for mounting said bus bar and contacts centrally within said housing.

OTTO JENSEN.

REFERENCES CITED

The following references are of record in the file of this patent:

UNITED STATES PATENTS

| Number | Name | Date |
| --- | --- | --- |
| 1,808,570 | Powers | June 2, 1931 |
| 1,968,869 | Austin | Aug. 7, 1934 |
| 2,008,139 | Massey et al. | July 16, 1935 |
| 2,179,636 | Koehler | Nov. 14, 1939 |
| 2,203,863 | Farrell | June 11, 1940 |
| 2,229,006 | Rudd | Jan. 14, 1941 |